United States Patent [19]

Toumayan

[11] Patent Number: 4,685,116

[45] Date of Patent: Aug. 4, 1987

[54] INCREMENTAL COUNT DISPLAY SYSTEM

[75] Inventor: Burton B. Toumayan, Chicago, Ill.

[73] Assignee: Motorola, Inc., Schaumburg, Ill.

[21] Appl. No.: 888,629

[22] Filed: Jul. 21, 1986

Related U.S. Application Data

[63] Continuation of Ser. No. 667,243, Nov. 1, 1984.

[51] Int. Cl.4 ........................ G06M 3/06; G06F 11/32

[52] U.S. Cl. ........................................ 377/51; 377/24; 364/561

[58] Field of Search .................... 377/24, 51; 324/166; 235/95 R, 95 B, 95 C; 364/561

[56] References Cited

U.S. PATENT DOCUMENTS

| | | | |
|---|---|---|---|
| 3,420,988 | 1/1969 | Hunt et al. | 377/51 |
| 3,808,407 | 4/1974 | Ratz | 377/51 |
| 3,864,552 | 2/1975 | Phillips | 377/24 |
| 4,244,514 | 1/1981 | Nomura et al. | 377/24 |
| 4,281,389 | 7/1981 | Smith | 364/561 |
| 4,382,178 | 5/1983 | Muri | 377/24 |
| 4,559,637 | 12/1985 | Weber | 377/24 |

*Primary Examiner*—John S. Heyman
*Attorney, Agent, or Firm*—Steven G. Parmelee

[57] ABSTRACT

An incremental count display system having a display (14) for displaying odometer information and trip odometer information. The display includes a display overflow indicia (21) that will not be permanently activated unless the odometer itself has been factory preset to an initial starting point of other than zero. Otherwise, the overflow indicia (21) must be reset with each display cycle. The trip odometer provides for an accurate count of trip mileage, even during a trip that includes an odometer memory rollover cycle. In addition, the trip odometer display makes use of a masking technique to avoid automatically writing to non-volatile memory (12). Also, an error indicia can be displayed in response to early failure detection.

13 Claims, 6 Drawing Figures

INCREMENTAL COUNT DISPLAY SYSTEM

This is a continuation of application Ser. No. 667,243, filed Nov. 1, 1984.

TECHNICAL FIELD

This invention relates generally to a method of providing a display, and more particularly to a method of providing a display of a count, and of a subcount of a count, of incrementally increasing data as occurs with an automobile odometer and trip odometer.

BACKGROUND ART

With the increased acceptance of and demand for electronic display and information systems, as in automobiles, systems designers have been confronted with a variety of problems. Some of these problems relate to providing data output in a form most useful to the viewer, and others relate simply to esthetic issues. One problem in particular, however, has presented a more serious issue because it touches upon both state and federal legal restrictions and requirements; the provision of an electronic odometer and trip odometer.

The task of the vehicle odometer and trip odometer can be described easily enough. The odometer must accurately measure and report the total distance the monitored vehicle has ever been driven. This information will be relied upon by maintenance personnel and by potential purchasers of the vehicle.

The trip odometer must accurately measure and report the total distance the monitored vehicle has been driven since a particular preselected starting point. This information will be relied upon by persons who are seeking to evaluate the vehicle's performance, maintaining maintenance schedules, or accumulating travel data. An odometer or trip odometer that fails to accurately measure travelled distance, or that fails to accurately report this distance, can contribute to incorrect decisions by these persons.

Current mechanical odometers and trip odometers meet these needs by providing geared members that turn in accordance with a calibrated schedule that relates to the distance being traveled by the vehicle. Simply stated, when the vehicle moves forward, the gears turn and the odometer count advances. When the vehicle does not move, the gears do not move and the odometer readout remains quiescent though viewable. The trip odometer differs from the odometer only in that the trip odometer may be easily reset to zero by the operator.

Fully electronic odometers and trip odometers are becoming available. Electronic displays for use with odometers and trip odometers are available, though such devices are not without problems. For instance, some sort of overflow indicia must be provided to indicated when the odometer reading has rolled over; i.e., that condition which results when the odometer display has exceeded its capacity and the odometer count has continued to advance. The prior art solution has been to provide a star or other overflow indicia that becomes a permanent part of the display when the odometer display rolls over. Unfortunately, other factors, such as strong radio frequency fields and the like, can ocassionally interfere with proper operation of an electronic odometer and cause the overflow indicia to be inadvertently set. Since this indicia becomes a permanent part of the display in prior art devices, the operator has no readily available means of correcting the display.

Further, an operator may wish to display the distance travelled by the vehicle in either English units or metric units. Though prior art devices allow such an option, there exists a possibility that a display in one unit of measurement would necessitate the provision of an overflow indicator, but not for another unit of measurement. An overflow indicator that becomes a permanent part of the display cannot readily accommodate such a need.

Trip odometer displays are also not without problem. Current prior art trip odometer displays operate by storing the trip start marker (i.e., the odometer reading at the start of the trip) in a non-volatile memory location. This trip marker may then be subtracted from later odometer readings in order to calculate and display the distance travelled during the trip. When the display capacity of the trip odometer has been met or exceeded, the prior art teaches that the original trip marker should be erased and a new trip marker should be automatically input and stored in the non-volatile memory.

There are two main problems associated with this prior art system. First, it is desirable to minimize erase/write events to the non-volatile memory, since such memories do have a finite lifetime. In addition, every erase/write event carries with it at least a small probability of error that may lead to inaccuracy, or, at worst, a disabling of the non-volatile memory device.

Second, prior art trip odometers fail to adequately resolve the situation that arises when the trip marker precedes a memory capacity rollover for the odometer. More particularly, all vehicle odometers have some upper limit with respect to the total distance that can be measured. If a trip marker precedes this upper limit, and the distance to be measured exceeds this point, then prior art techniques will provide an inaccurate indication of trip distance travelled.

There therefore exists a need for an incremental count display system that may be satisfactorily utilized in an odometer and trip odometer setting, and that will avoid the above indicated problems and limitations.

SUMMARY OF THE INVENTION

The above needs are substantially met by provision of the incremental count display system disclosed in this specification. This system comprises a method of only temporarily displaying the overflow indicator to avoid a permanent error and to better accomodate varying scales of measurement. In another embodiment, the method further includes steps to provide an accurate trip odometer display while, at the same time, avoiding all but necessary use of the non-volatile memory associated with the system. In yet another embodiment, the method has additional steps to provide an accurate trip odometer display even following memory rollover for the odometer data.

In a preferred embodiment, odometer data can be generated, according to well understood prior art techniques, as a series of electric pulses that relate to distance travelled by a vehicle. Here, it may be presumed that 8,000 such pulses are provided per mile travelled. Odometer values can be stored in units of 0.02 miles, with 160 pulses equalling each 0.02 mile. A non-volatile memory storage system suitable for storing such a count of incrementally increasing data and further being suitable for use with the incremental count display system disclosed herein has been set forth in the specification of Ser. No. 667,039 as filed on even date herewith and as having one common inventor. The abovementioned specification is specifically incorporated herein by reference.

Pursuant to this method, an appropriate display may be provided. Such a display has five full seven-segment digits and one ½ digit numerical digit representations for displaying odometer and trip odometer information. The display also includes an overflow indicia comprising a star which may be selectively activated and deactivated, a trip display indicia, and a scale indicia. In addition, the method provides for the provision of non-volatile memory for storing selected count data such as trip start odometer information, an input unit for allowing an operator to selectively input such selected count data into the non-volatile memory, a scale switch for allowing the count data to be displayed in two or more different scales, and a trip odometer display input for allowing trip odometer data to be displayed.

According to this method, the count of incrementally increasing data representing distance travelled by the vehicle will be incremented in response to the incoming data. This incrementally increased count will be compared with a first preselected number that relates to the display capacity; in this case, 199,999 miles or kilometers. If the count is less than this preselected number, then the overflow indicia will not be activated and the up-dated count information will be displayed. If, however, the count does exceed the preselected number, then the overflow indicia will be temporarily activated and the count information will be displayed. The above steps may then be repeated to ensure timely up-dates of odometer information.

It should be understood that if the overflow indicia becomes activated through error, it may be corrected since the overflow indicia will only be temporarily displayed. If the error has resulted through some permanent condition, of course, the indicia activation decision may be made incorrectly with each pass. If the error has only resulted through some temporary condition, however, such as exposure to a strong radio frequency field, the problem will likely be able to self-correct, and the overflow indicia removed from the display.

By provision of a temporarily assigned overflow indicia, the overflow indicia can also be correctly used when appropriate with odometer readings in different scales. For instance, the distance 180,000 miles would not require the overflow indicia to be displayed. If this were converted to kilometers, however, the distance would exceed the 199,999 kilometer capacity of the display, and hence the overflow indicia should be activated. If the overflow indicia could only be permanently assigned, there could be no flexibility in displaying such information. With this invention, however, the mileage reading could be displayed without the overflow indicia and the kilometer reading could be displayed with it.

The method also provides for steps to ensure an accurate display of a subcount of such incrementally increasing data, such as the distance travelled during a particular trip. Pursuant to this method, the trip marker comprising the initial odometer setting at the start of the trip will be read and compared with the current total odometer value. If the trip marker does not exceed the total odometer, then a subcount will be calculated pursuant to a formula that subtracts the trip marker from the total odometer reading. If, however, the trip marker does exceed the total odometer, the subcount will be calculated pursuant to a formula that holds that the total odometer reading be added to the difference between the maximum odometer capacity and trip marker. This assures that an accurate trip odometer reading can be obtained even following odometer memory rollover.

An inquiry will then be made to determine whether the resulting subcount exceeds the display capacity. If it does not, then the subcount will be displayed. If the subcount does exceed the trip display, then a portion of the trip odometer reading will be displayed pursuant to a masking technique that ensures accuracy of the less significant information. As a result, a new trip marker need not be automatically entered into the non-volatile memory, thereby minimizing wear and tear on that memory part and reducing the chance of error.

Through provision of this system, the overflow indicia cannot be permanently set through a transient odometer error or some similar malfunction. Rather, if such an error occurs, the system will continually reinspect itself and, at such time as the error has cleared, will extinguish the overflow indicia. Further, the trip odometer operates without ever resorting to the non-volatile memory on an automatic basis, and an accurate trip count can be assured even following rollover of the odometer memory capacity.

BRIEF DESCRIPTION OF THE DRAWINGS

These and other attributes of the invention will become more clear upon a thorough review and study of the following description of the best mode for carrying out the invention, particularly when reviewed in conjunction with the drawings, wherein.

BEST MODE FOR CARRYING OUT THE INVENTION

The incremental count display system disclosed in this specification has particular use for electronic odometers and trip odometers utilized in conjunction with vehicular electronic displays and information systems. The invention has particular applicability for use with systems wherein the distance travelled by the vehicle being monitored gives rise to a series of electric pulses that relate in number to the actual distance travelled. These pulses constitute an incrementally increasing data base that, when accurately counted, will reflect the total distance travelled by the vehicle and any desired subcount will reflect a specific distance travelled by the vehicle.

Figure 1:
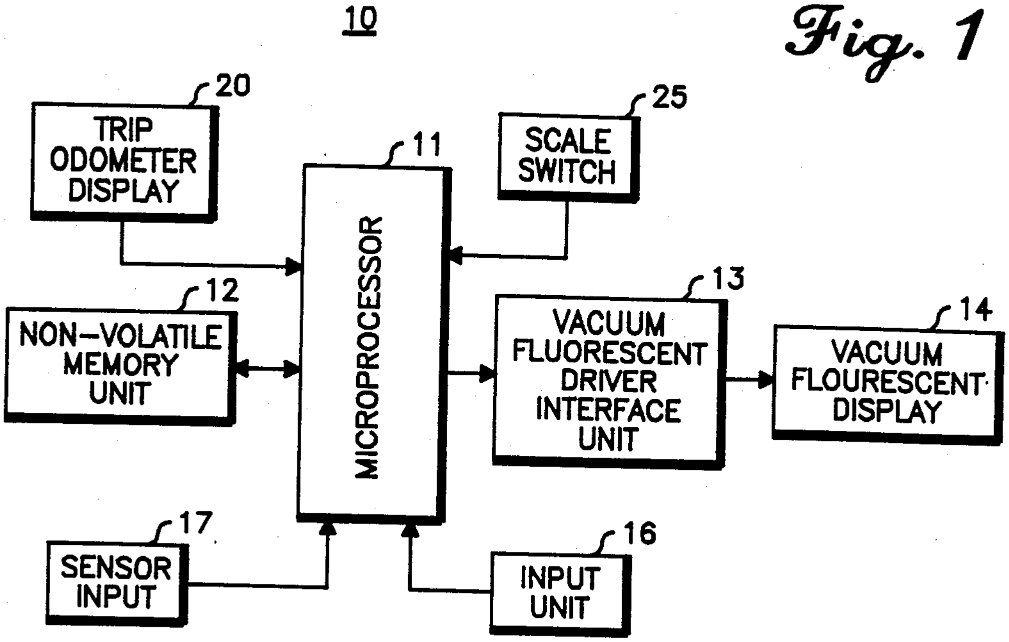
FIG. 1 comprises a block diagram view of the invention.

Referring to FIG. 1, apparatus for carrying out the method of the invention can be seen as depicted generally by the numeral 10. The apparatus (10) includes generally a microprocessor (11), a non-volatile memory unit (12), a vacuum florescent driver interface unit (13), a vacuum florescent display (14), an input unit (16), a sensor input (17), a trip odometer display switch (20) and a scale selection switch (25).

The microprocessor (11) may be provided through use of an MC6805R3 as manufactured by Motorola, Inc. The non-volatile memory unit may be provided through use of a COP494E EEPROM as manufactured by National Semiconductor Corp. The vacuum florescent driver interface unit (13) may be provided through use of an SN75518 as manufactured by Texas Instruments. The vacuum florescent display (14) may be provided through use of a DS602 as manufactured by Futaba. Finally, the input unit (16), trip odometer display switch (20) and scale selection switch (25) may be provided through use of any appropriate switches.

The microprocessor (11) includes both resident read-only memory (ROM) and random access memory (RAM). A program containing a series of sequential instructions for practicing the method can be stored in the ROM. The RAM memory can be utilized to perform certain calculations and to temporarily store certain data.

Figure 2:
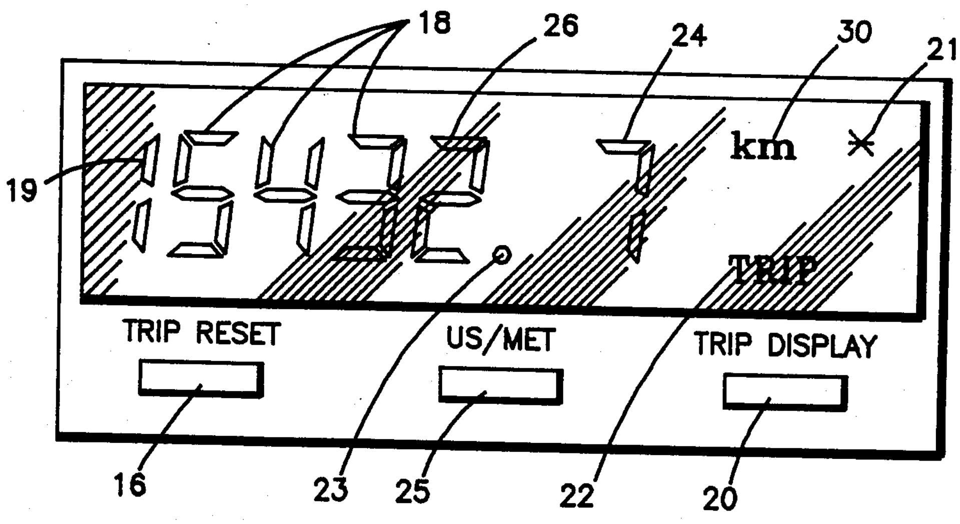
FIG. 2 comprises a front elevational view of the display.

Referring to FIG. 2, the vacuum florescent display (14) has a plurality of numerical digit representations (18) for allowing a count of incrementally increasing data to be displayed. In the particular embodiment depicted, the five least significant digits are each formed of seven segment displays capable of protraying any number between zero and nine. The most significant digit (19) can either be blanked or display a one.

In addition, the display (14) includes a scale indicia (30), an overflow indicia (21), a trip odometer display indicia (22) and a decimal point (23) positioned between the least significant digit (24) and the next least significant digit (26).

Figure 3A:
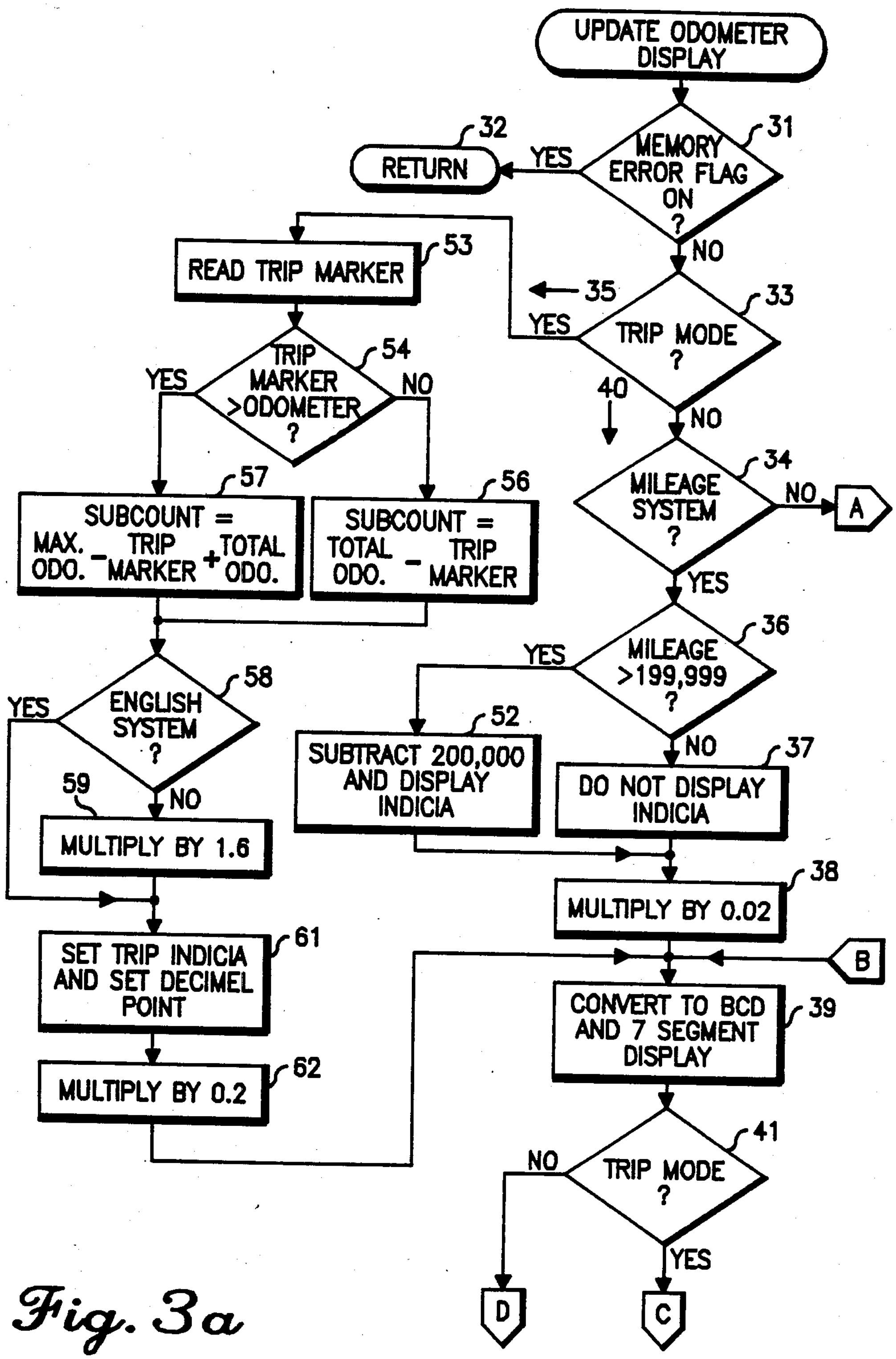
FIGS. 3*a*, 3*b* and 3*c* comprise a flowchart depiction of the method.
Figure 3B:
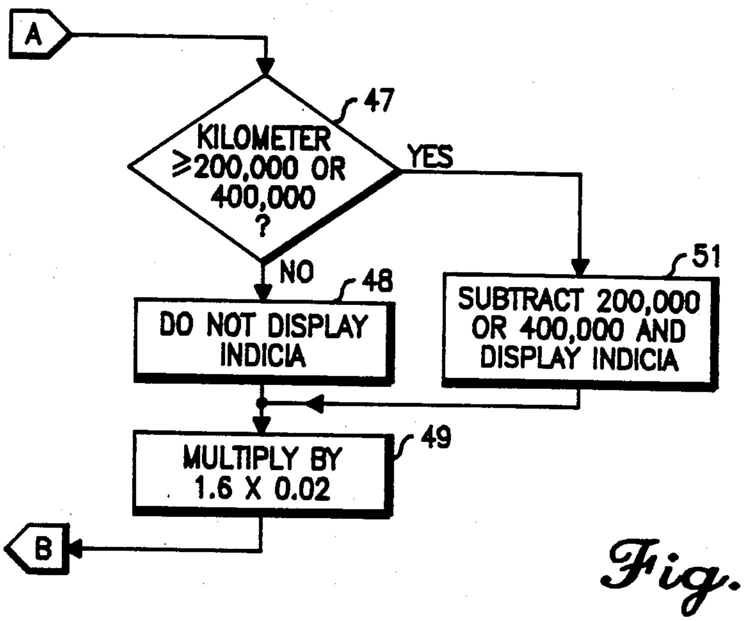
Figure 3C:
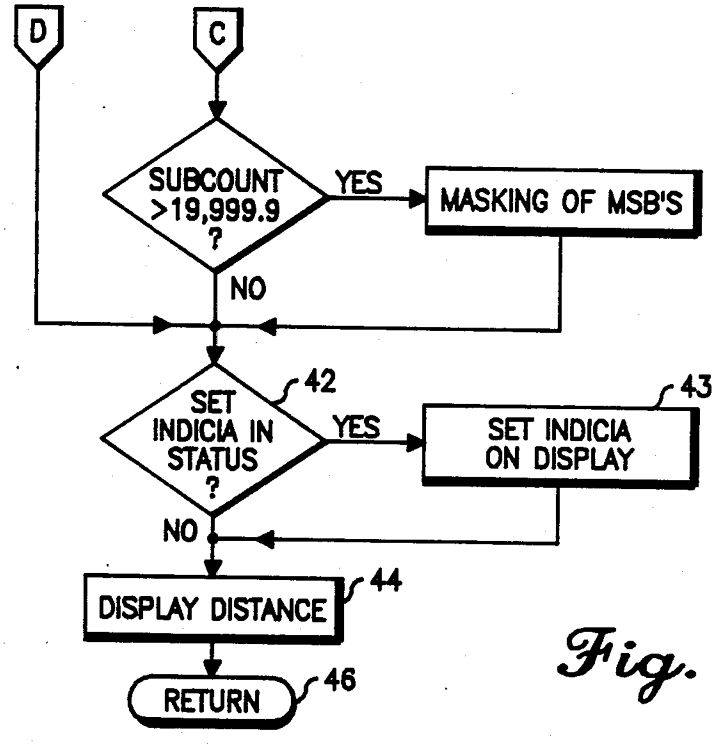

Referring to FIG. 3, a flowchart depiction of the method will now be described.

To begin, a determination will be made as to whether any error flags relating to memory are evident (31). If they are, then the odometer display will be frozen, and the program will return to its primary routine (32).

Presuming that no memory error flags have been set, a determination will be made as to whether the trip odometer display mode has been chosen (33). If it has, then the trip odometer route (35) will be taken, which route (35) will be described in more detail below.

Presuming that the odometer route (40) has been chosen, a determination will be made as to whether the operator has requested a mileage scale display or a metric scale display (34). If the mileage scale has not been selected, then a scale conversion subroutine will be utilized as described in more detail below. Otherwise, presuming that the mileage scale has been opted, a determination will be made as to whether the odometer count exceeds the display capacity; in this case 199,999 miles (36). If the display capacity has not been exceeded, then a decision will be made to not display the overflow indicia (37). Following this, the count will be multiplied by 0.02 (38) to convert the count to mileage. Following this, a conversion will be made into binary coded decimal (39).

Following this, a determination will again be made as to whether the trip odometer display mode has been chosen (41). If it has, then another determination will be made regarding the trip odometer as will be described in more detail below. Otherwise, a determination will be made as to whether a permanent set overflow indicia has been programmed into the non-volatile memory (42). This occurs when an odometer has been installed in an automobile and the initial odometer setting is preset to any number other than zero. If this set overflow indicia is present in memory, then the overflow indicia will be activated (43). Following this, the odometer reading will be displayed (44) on the display unit and the program will return to the primary routine (46).

If the metric system has been opted for by appropriate manipulation of the scale switch (25), then the scale determination node (34) described above will next provide that an inquiry be made as to whether the odometer count equals or exceeds 200,000 or 400,000 kilometers (47). If not, the overflow indicia will not be displayed (48). Following this, the count will be multiplied by 1.6 (as a conversion rate) and by 0.02 to obtain a kilometers figure (49). The resulting number will then be converted into binary coded decimal (39) and the following steps will proceed as indicated above.

If the odometer count does equal or exceed 200,000 or 400,000 kilometers as inquiried above (47), then 200,000 or 400,000, as appropriate, will be subtracted from the count and a display overflow indicia instruction will be set (51). Following this, the appropriate conversion factors will be applied (49).

Similarly, when the inquiry is made as to whether the mileage count exceeds 199,999 miles (36), if the answer is yes, 200,000 will be subtracted from the accumulated count and a display overflow indicia instruction will be set (52).

When the trip odometer route (35) has been selected, the trip marker as previously entered into the non-volatile memory unit (12) through manipulation of the input unit (16) will be read (53). Following this, a determination will be made as to whether this trip marker exceeds the current odometer reading (54). If it does not, then a subcount will be calculated by subtracting the trip marker from the odometer reading (56). If the trip marker does exceed the odometer reading, then the subcount will be calculated by adding the current odometer reading to the difference between the maximum possible odometer value and the trip marker (57).

Following this, a determination will be made as to whether the trip odometer results are to be displayed in mileage or metric scale (58). If in the metric scale, the resulting count will be multiplied by 1.6 (59). The program then will set the trip odometer indicia (22) and the decimal point (23) to assure an accurate and understandable display (61). Following this, the trip odometer reading will be multiplied by 0.2 (62) and will then be converted to binary coded decimal (39) to display in tenths of a kilometer or mile.

Following this, a determination will again be made as to whether the trip odometer mode has been selected (41). If it has, then an inquiry will be made as to whether the subcount exceeds 19,999.9. If it doesn't, then the program will proceed to determine whether the set overflow indicia has been placed in the non-volatile memory as described above (42). If the subcount does exceed this value (which represents the display capacity of the display (14)), then the program will determine whether the digit in the ten thousandths column comprises an odd or an even number. If odd, then the most significant digit (19) on the display (14) will be masked to display a one. If even, then the most significant digit (19) on the display (14) will be masked blank. Following this, the program will proceed as described above, with the exception that when the trip odometer reading is displayed (44), only the five least significant digits will be displayed, in conjunction with the masked most significant bit (19).

Importantly, the method never requires that any additional values be written to the non-volatile memory (12) on an automatic basis due to the operation of the trip odometer requirements. Rather, the only time a number will be stored in non-volatile memory will be when the operator manipulates the input unit (16) to restart a trip count. Further, it will be appreciated that this method assures that an accurate trip count will be maintained even if a trip count proceeds past a memory capacity rollover.

Finally, it will be appreciated that, except in the situation where a factory set odometer has been installed with an initial reading of more than zero, a redetermination will be made at every display interval as to whether the overflow indicia (21) should be provided. This allows the system to correct errors that may be made regarding display of the overflow indicia (21), and further allows the system to have the overflow display (21) be displayed when appropriate for one scale, even if not required for other scales that may be displayed with the system.

Figure 4:
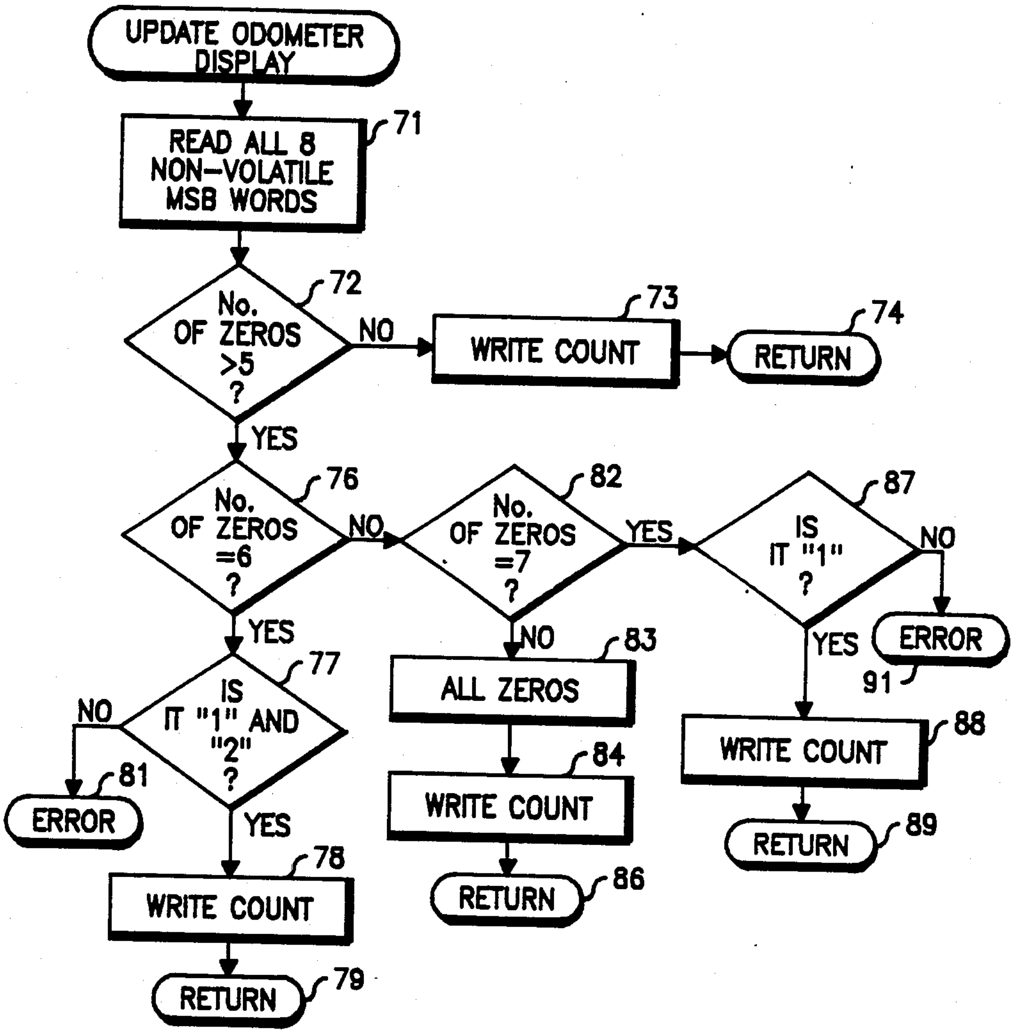
FIG. 4 comprises a flowchart depiction of an additional embodiment.

Referring now to FIG. 4, an additional embodiment will be disclosed that provides for error detection and display during the first few writes to the non-volatile memory (12).

Presuming the provision of an empty non-volatile memory (12) (as would be found with, for instance, a new automobile), the system first reads the non-volatile memory (12) to ascertain the memory contents (71). Following this a determination will be made as to whether more than five of the eight available most significant bits memory locations contain a zero (72) (i.e., are empty). If not, the updated odometer count will be stored as usual (73) and the system will return to its primary sequence (74).

If more than five memory locations do contain zero, than a determination will be made as to whether exactly six of these memory locations contain a zero (76). If so, an inquiry will be made to determine if the two remaining memory locations contain a "1" and a "2" (77). If they do, then the odometer count can be presumed accurate and the updated count can be stored (78) in the usual way and the program returned to its normal sequence (79). Otherwise, an error signal (81) can be provided on the display (14) to alert the operator of the problem.

If more than six memory locations contain zero, a determination will be made as to whether exactly seven memory locations contain zero (82). If not, all zeros can be presumed (83) and the count storage (84) and return (86) functions can be carried out in the usual way.

If exactly seven memory locations do contain zero, an inquiry will be made to determine whether the last remaining memory location contains a "1" (87). If it does, then the odometer count can be presumed accurate and the updated count can be stored (88) in the usual way and the program returned to its primary sequence (89). Otherwise, an error signal (91) can be provided on the display (14) to alert the operator of the problem.

By provision of this feature, an early determination can be made and an indication provided regarding the accuracy of the system. More particularly, the system knows what data should be in memory during the first few writes to memory, and can compare the stored data with what should be there. If an unfavorable comparison results, the system can recognize this as an error and alert the operator. The error indicia can be provided in many ways. For instance, the display (14) can be blanked or the current odometer count could be frozen.

Various changes and modifications to this embodiment will be obvious to those skilled in the art. For instance, this system would have applicability in areas other than automobile odometers. Such changes and modifications are not to be considered as outside the scope of the claims unless specifically limited thereby.

I claim:

1. A method of providing a display of a count of incrementally increasing data, comprising the following steps:

(a) providing a display having a plurality of numerical digital representations for displaying said count, said display having a capacity limit as to the largest numerical digital representation that can be displayed thereon;

(b) providing non-permanent overflow indicia means for signalling that said count has exceeded said display's capacity limit;

(c) incrementally increasing said count in response to said incrementally increasing data;

(d) comparing said incrementally increased count with a preselected number;

(e) when said incrementally increased count is less than said preselected number, do not activate said overflow indicia means such that said overflow indicia means is deactivated following previous activation, accidental or otherwise and repeat from step c;

(f) when said incrementally increased count is not less than said preselected number, activate said overflow indicia means and repeat from step c.

2. The method of claim 1 wherein said method further includes the provision of scale switch means for allowing said count of incrementally increasing data to be displayed in at least two different scales, and further including the step of determining which scale has been selected pursuant to said scale switch and multiplying said count by a conversion factor to provide a display in said preselected scale.

3. The method of claim 2 wherein said conversion steps occur prior to comparing said incrementally increased count with said preselected number, such that said overflow indicia means can be activated if needed for a display in one scale, but not in another scale if not needed.

4. The method of claim 1 wherein said overflow indicia means comprises a star shaped display.

5. A method of providing a display of a subcount of a count of incrementally increasing data, comprising the following steps:

(a) providing a display having a plurality of numerical digit representations for displaying said subcount;

(b) providing a non-volatile memory for storing selected count data;

(c) providing input means for selectively inputting said selected count data into said non-volatile memory;

(d) activating said input means to cause said selected count data to be input into said memory;

(e) incrementally increasing said count in response to said incrementally increasing data;

(f) subtracting said selected count data from said incrementally increased count to obtain said subcount;

(g) determining whether at least one preselected digit in said subcount is odd or even;

(h) when said preselected digit is even, masking at least one preselected digit representation in said display to display a first preselected indicia;
(i) when said preselected digit is odd, masking said at least one preselected digit representation in said display to display a second preselected indicia;
(j) displaying only that part of said subcount that comprises digits less significant than said at least one preselected digit;
(k) repeat from step e.

6. The method of claim 5 wherein said display has six numerical digital representations.

7. The method of claim 6 wherein said most significant digit representation on said display can either be a zero or a one but no other number.

8. The method of claim 5 wherein said first preselected indicia is a zero, and said second preselected indicia is a one.

9. The method of claim 8 wherein said display includes a decimal point between a least significant digit and a next least significant digit, and said display of said subcount includes said decimal point.

10. A method of providing a display of a subcount of a count of incrementally increasing data, comprising the following steps:
(a) providing a display having a plurality of numerical digit representations for displaying said subcount;
(b) providing a non-volatile memory for storing selected count data;
(c) providing input means for selectively inputting said selected count data into said non-volatile memory;
(d) activating said input means to cause said selected count data to be input into said memory;
(e) incrementally increasing said count in response to said incrementally increasing data;
(f) providing a subcount by subtracting said selected count data from said incrementally increased count;
(g) displaying at least a portion of said subcount on said display;
(h) repeating from step e such that said selected count data as stored in said memory will not change in value unless said input means is activated and said input means will not be automatically activated when said display exceeds its display capacity.

11. The method of claim 10 wherein said input means may only be activated selectively by an operator, and not automatically.

12. A method of providing a display of a subcount of a count of incrementally increasing data, comprising the following steps:
(a) providing a display having a plurality of numerical digit representations for displaying said subcount;
(b) providing a first memory for storing selected count data;
(c) providing input means for selectively inputting said selected count data into said first memory;
(d) providing a second memory for storing said count up to a maximum count;
(e) activating said input means to cause said selected count data to be input into said first memory;
(f) incrementally increasing said count in response to said incrementally increasing data;
(g) storing said incrementally increased count in said second memory;
(h) determining whether said selected count data exceeds said incrementally increased count;
(i) when said selected count data does not exceed said incrementally increased count, providing said subcount by subtracting said selected count data from said incrementally increased count, displaying at least a portion of said subcount on said display, and repeating from step f;
(j) when said selected count data does exceed said incrementally increased count, providing said subcount by subtracting said selected count data from said maximum count and adding said incrementally increased count, displaying at least a portion of said subcount on said display, and repeating from step f.

13. A method of providing a display of a count of incrementally increasing data, comprising the following steps:
(a) providing a display for displaying said count and for selectively displaying error indicia;
(b) providing a plurality of memory locations for storing at least a part of said count;
(c) incrementally increasing said count in response to said incrementally increasing data;
(d) reading at least some of said memory locations;
(e) determining whether at least a preselected number of said memory locations are empty of stored contents, and when this occurs, proceeding to step i below;
(f) storing at least part of said incrementally increased count in at least one of said memory locations;
(g) displaying at least a part of said increased count on said display;
(h) repeating from step c;
(i) comparing said memory location stored contents that are non-zero with at least one preselected value;
(j) proceeding to step f above when said compared stored contents equal said at least one preselected value;
(k) displaying said error indicia when said compared stored contents do not equal said at least one preselected value;
(l) repeating from step c.

* * * * *